United States Patent
Wallach (10) Patent No.: US 11,620,239 B2
(45) Date of Patent: Apr. 4, 2023

(54) DOMAIN REGISTER FOR INSTRUCTIONS BEING EXECUTED IN COMPUTER PROCESSORS

(71) Applicant: Micron Technology, Inc., Boise, ID (US)

(72) Inventor: Steven Jeffrey Wallach, Dallas, TX (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 17/154,722

(22) Filed: Jan. 21, 2021

(65) Prior Publication Data

US 2021/0141742 A1    May 13, 2021

Related U.S. Application Data (63) Continuation of application No. 16/520,298, filed on Jul. 23, 2019, now Pat. No. 10,915,465.

(60) Provisional application No. 62/724,999, filed on Aug. 30, 2018, provisional application No. 62/724,896, filed on Aug. 30, 2018, provisional application No. 62/724,913, filed on Aug. 30, 2018, provisional application No. 62/724,929, filed on Aug. 30, 2018.

(51) Int. Cl.
*G06F 12/14*   (2006.01)
*G06F 12/10*   (2016.01)
*G06F 21/53*   (2013.01)

(52) U.S. Cl.
CPC .......... *G06F 12/1458* (2013.01); *G06F 12/10* (2013.01); *G06F 21/53* (2013.01); *G06F 2212/1052* (2013.01); *G06F 2221/034* (2013.01)

(58) Field of Classification Search
CPC .. G06F 9/45533; G06F 12/1441; G06F 21/53; G11C 11/408
See application file for complete search history.

(56) References Cited

U.S. PATENT DOCUMENTS 4,386,399 A    5/1983   Rasala et al.
4,409,655 A   10/1983   Wallach et al.
(Continued)

FOREIGN PATENT DOCUMENTS

WO    2013174503 A1    11/2013

OTHER PUBLICATIONS

"Hash table. Collision resolution by chaining (closed addressing)", Algorithms and Data Strcutures: with implementations in Java and C++, http://www.algolist.net/Data_structures/Hash_table/Chaining, printed on Aug. 30, 2018.
(Continued)

*Primary Examiner* — Tammara R Peyton (74) *Attorney, Agent, or Firm* — Greenberg Traurig (57) ABSTRACT

Systems, apparatuses, and methods related to a domain register of a processor in a computer system are described. The computer system has a memory configured to at least store instructions of routines that are classified in multiple predefined, non-hierarchical domains. The processor stores in the domain register an identifier of a current domain of a routine that is being executed in the processor. The processor is configured to perform security operations based on the
(Continued)

content of the domain register and the security settings specified respectively for the predefined, non-hierarchical domains.

20 Claims, 6 Drawing Sheets

(56) References Cited

U.S. PATENT DOCUMENTS

| | | | |
|---|---|---|---|
| 4,525,780 | A | 6/1985 | Bratt et al. |
| 4,821,184 | A | 4/1989 | Clancy et al. |
| 5,280,614 | A | 1/1994 | Munroe et al. |
| 6,446,188 | B1 | 9/2002 | Henderson et al. |
| 7,370,193 | B2 | 5/2008 | Shao et al. |
| 8,245,270 | B2 | 8/2012 | Cooperstein et al. |
| 8,607,299 | B2 | 12/2013 | Baker |
| 8,713,563 | B2 | 4/2014 | Kondoh et al. |
| 9,405,515 | B1 | 8/2016 | Bertram et al. |
| 9,519,779 | B2 | 12/2016 | Ghosh et al. |
| 9,575,784 | B1 | 2/2017 | Aron et al. |
| 9,852,084 | B1 | 12/2017 | Soderquist et al. |
| 10,043,001 | B2 | 8/2018 | Ghosh et al. |
| 10,915,465 | B2 | 2/2021 | Wallach |
| 11,481,241 | B2 * | 10/2022 | Wallach ............... G06F 9/45558 |
| 2004/0133777 | A1 | 7/2004 | Kiriansky et al. |
| 2005/0257243 | A1 | 11/2005 | Baker |
| 2008/0091891 | A1 | 4/2008 | Shiota et al. |
| 2008/0250217 | A1 | 10/2008 | Kershaw et al. |
| 2008/0276051 | A1 | 11/2008 | Renno |
| 2009/0259846 | A1 | 10/2009 | Watt et al. |
| 2010/0228936 | A1 | 9/2010 | Wright et al. |
| 2010/0235598 | A1 | 9/2010 | Bouvier |
| 2012/0036334 | A1 | 2/2012 | Horman et al. |
| 2014/0173169 | A1 | 6/2014 | Liu et al. |
| 2014/0331019 | A1 | 11/2014 | Parker et al. |
| 2015/0100717 | A1 | 4/2015 | Bennett et al. |
| 2016/0110298 | A1 | 4/2016 | Koufaty et al. |
| 2016/0210082 | A1 | 7/2016 | Frank et al. |
| 2016/0350019 | A1 | 12/2016 | Koufaty et al. |
| 2016/0381050 | A1 | 12/2016 | Shanbhogue et al. |
| 2017/0060783 | A1 | 3/2017 | Chiu et al. |
| 2018/0095902 | A1 | 4/2018 | Lemay et al. |
| 2018/0121665 | A1 | 5/2018 | Anderson et al. |
| 2019/0102537 | A1 | 4/2019 | Zhang et al. |
| 2019/0196983 | A1 | 6/2019 | Khosravi et al. |
| 2020/0073693 | A1 | 3/2020 | Wallach |
| 2020/0073694 | A1 | 3/2020 | Wallach |
| 2020/0073820 | A1 | 3/2020 | Wallach |
| 2020/0073821 | A1 | 3/2020 | Wallach |
| 2020/0073822 | A1 | 3/2020 | Wallach |
| 2020/0073827 | A1 | 3/2020 | Wallach |
| 2020/0074093 | A1 | 3/2020 | Wallach |
| 2020/0074094 | A1 | 3/2020 | Wallach |

OTHER PUBLICATIONS

Call stack, Wikipedia, printed on Aug. 10, 2018.
Capability-based addressing, Wikipedia, printed on Sep. 13, 2018.
Explain Hashed page tables in operating system, https://cs.stackexchange.com/questions/85207/explain-hashed-page-tables-in-operating-system, printed on Aug. 17, 2018.
G. J. Myers, B. R. S. Buckingham, "A Hardware Implementation of Capability-based Addressing", ACM SIGARCH Computer Architecture News Homepage archive, vol. 8, Iss. 6, Oct. 1980.
George Radin, Peter R. Schneider, "An Architecture for an Extended Machine With Protected Addressing", May 21, 1976.
Hash table, Wikipedia, printed on Aug. 30, 2018.
Hypervisor, Wikipedia, printed on Apr. 19, 2018.
International Search Report and Written Opinion, PCT/US2019/048015, dated Dec. 12, 2019.
International Search Report and Written Opinion, PCT/US2019/048006, dated Dec. 11, 2019.
International Search Report and Written Opinion, PCT/US2019/048008, dated Dec. 12, 2019.
International Search Report and Written Opinion, PCT/US2019/048023, dated Dec. 17, 2019.
International Search Report and Written Opinion, PCT/US2019/048020, dated Dec. 17, 2019.
International Search Report and Written Opinion, PCT/US2019/048019, dated Dec. 17, 2019.
International Search Report and Written Opinion, PCT/US2019/048013, dated Dec. 13, 2019.
International Search Report and Written Opinion, PCT/US2019/048018, dated Dec. 17, 2019.
Michael D. Schroeder, Jerome H. Saltzer, "A Hardware Architecture for Implementing Protection Rings", Presented at the Third ACM Symposium on Operating Systems Principles, Palo Alto, CA, Oct. 1971.
Page replacement algorithm, Wikipedia, printed on Jul. 31, 2018.
Page table, Wikipedia, printed on Jul. 31, 2018.
Protection ring, Wikipedia, printed on Jul. 31, 2018.
R. S. Fabry, "Capability-Based Addressing", Communications of the ACM, Jul. 1974.
Sandbox (computer security), Wikipedia, printed on Aug. 21, 2018.
Stack register, Wikipedia, printed on Aug. 10, 2018.
The RISC-V Instruction Set Manual, vol. II: Privileged Architecture, May 7, 2017.
Extended European Search Report, EP19854049.4, dated Apr. 7, 2022.
Vilanova, Lluis. "CODOMs: Protecting Software with Code-centric Memory Domains." IEEE, 2014.

* cited by examiner

DOMAIN REGISTER FOR INSTRUCTIONS BEING EXECUTED IN COMPUTER PROCESSORS

RELATED APPLICATIONS

The present application is a continuation application of U.S. patent application Ser. No. 16/520,298, filed Jul. 23, 2019, issued as U.S. Pat. No. 10,915,465 on Feb. 9, 2021, and entitled "Memory Configured to Store Instructions of a Predefined Set of Domains Controllable via a Domain Register for Instructions being Executed in a Computer Processor," which claims the benefit of the filing dates of Prov. U.S. Pat. App. Ser. No. 62/724,999, filed Aug. 30, 2018 and entitled "Domain Register for Instructions being Executed in Computer Processors," Prov. U.S. Pat. App. Ser. No. 62/724,896, filed on Aug. 30, 2018 and entitled "Memory Access Control through Permissions Specified in Page Table Entries for Execution Domains," Prov. U.S. Pat. App. Ser. No. 62/724,913, filed on Aug. 30, 2018 and entitled "Security Configurations in Page Table Entries for Execution Domains," and Prov. U.S. Pat. App. Ser. No. 62/724,929, filed on Aug. 30, 2018 and entitled "Access Control for Processor Registers based on Execution Domains," the entire disclosures of which applications are hereby incorporated herein by reference.

TECHNICAL FIELD

At least some embodiments disclosed herein relate generally to computer architecture and more specifically, but not limited to, a computer processor register for the identification of a domain in which instructions are being executed.

BACKGROUND

Instructions programmed for a computer can be structured in layers. One layer can provide resources and services for another layer. For example, a hypervisor can create or provision virtual machines that are implemented on the hardware components of the computer. An operating system can offer resources and services using resources available in a computer having predefined architecture. The computer resources or computer operated upon by the operating system can be actual computer hardware components, or virtual machine components provisioned by a hypervisor. An application can provide application specific functions using the services and resources provided by an operating system.

BRIEF DESCRIPTION OF THE DRAWINGS

The embodiments are illustrated by way of example and not limitation in the figures of the accompanying drawings in which like references indicate similar elements.

DETAILED DESCRIPTION

The present disclosure includes the techniques of a domain register in a computer processor configured to control security operations in executing instructions in different, non-hierarchical, domains.

In a traditional system, different layers of instructions (e.g., user applications vs. operating system) may be given different levels of privilege and/or trust. Conventionally, protection rings have been constructed and implemented in computers to protect data and functionality from fault and malicious behaviors based on a hierarchy of rings. Rings are statically arranged in the hierarchy from most privileged (and thus most trusted) to least privileged (and thus least trusted). For example, the hierarchy can include a ring of operating system kernel that is the most privileged, a ring of device drivers, and a ring of applications that are the least privileged. A program or routine in a lower privilege ring can be limited by a respective special hardware enforced control gate to access the resources and services of a higher privilege ring in the hierarchy. Gating access between rings can improve security.

In the techniques of the present disclosure, instructions or routines programmed for a computer system can be classified into a set of predefined, non-hierarchical, domains, such as a domain of hypervisor, a domain of operating system, a domain of application, etc. A domain register is configured in a processor to store an identifier or indicator of the current domain of instructions being executed in the processor. The content of the domain register can control various security operations of the processor.

For example, when the execution of an instruction results in a request to access a memory location identified using a virtual memory address, the virtual memory address can be translated to a physical memory address using one or more page tables. The content of the domain register can be used to select, from a page table entry, a permission bit for the memory access made in the current domain. The selected permission bit can control the processing of the request to access a memory unit identified by the virtual memory address.

For example, when a call is made to execute a routine having a virtual memory address, the content of the domain register can be used to select a security bit from a page table entry that is used to translate the virtual memory address to a physical memory address. The security bit is selected for executing the routine in providing services for the current domain identified by the domain register. The selected security bit controls security operations of separating resources and/or data between the called routine and the calling routine.

For example, when the execution of an instruction generates a request to access a privileged register, the content of the domain register can be used to select, from a permission register for example, a permission bit for the current domain to access the privileged register. The permission bit can control the acceptance or rejection of the request to access the privileged register.

Figure 1:
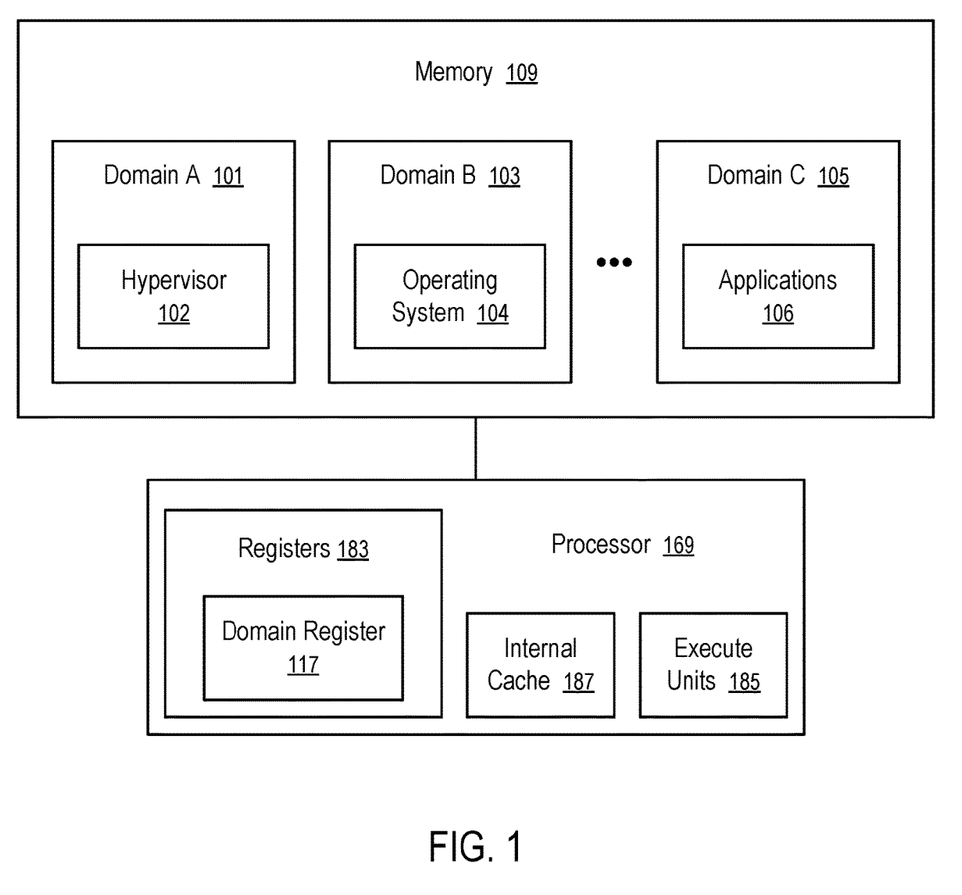
FIG. 1 shows a computer processor having a domain register according to some embodiments.

FIG. 1 shows a computer processor (169) having a domain register (117) according to some embodiments.

The computer processor (169) of FIG. 1 is coupled to memory (109) that stores routines of various predefined, non-hierarchical, domains (101, 103, . . . , 105), such as a domain (101) of hypervisor (102), a domain (103) of operating system (104), a domain (105) of application (106). The physical memory (109) can be used to store data and instructions for various routines programmed for a computer system.

For example, routines of a hypervisor (102) can be classified in a domain A (101); routines of an operating system (104) can be classified in another domain B (103); and routines of applications (106) can be classified in a further domain C (105). A hypervisor or virtual machine monitor (VMM) creates and manages virtual machines. The hypervisor can control basic functions such as physical memory and input/output (I/O).

In general, a routine can include a pre-programmed set of instructions stored in the memory (109). The routine can also have input data, output data, and/or, temporary data stored in the memory (109). A routine can invoke or call another routine for services and/or resources. The calling routine and the called routine can be in a same domain or different domains (e.g., 101, 103, . . . , 105).

The processor (169) of FIG. 1 has execution units (e.g., 185), such as an arithmetic-logic unit. The processor (169) can include an internal cache (187) as a proxy of a portion of the memory (109). The processor (169) has registers (183) to hold instructions for execution, data as operands of instructions, and/or results of instruction executions.

The domain register (117) is one of the registers (183) of the processor (169). The domain register (117) stores the identifier or indicator of a current domain of a set of instructions (e.g., a routine) being executed in the processor (169). The content of the domain register (117) controls security operations in the processor (189) as further discussed below.

Figure 2:
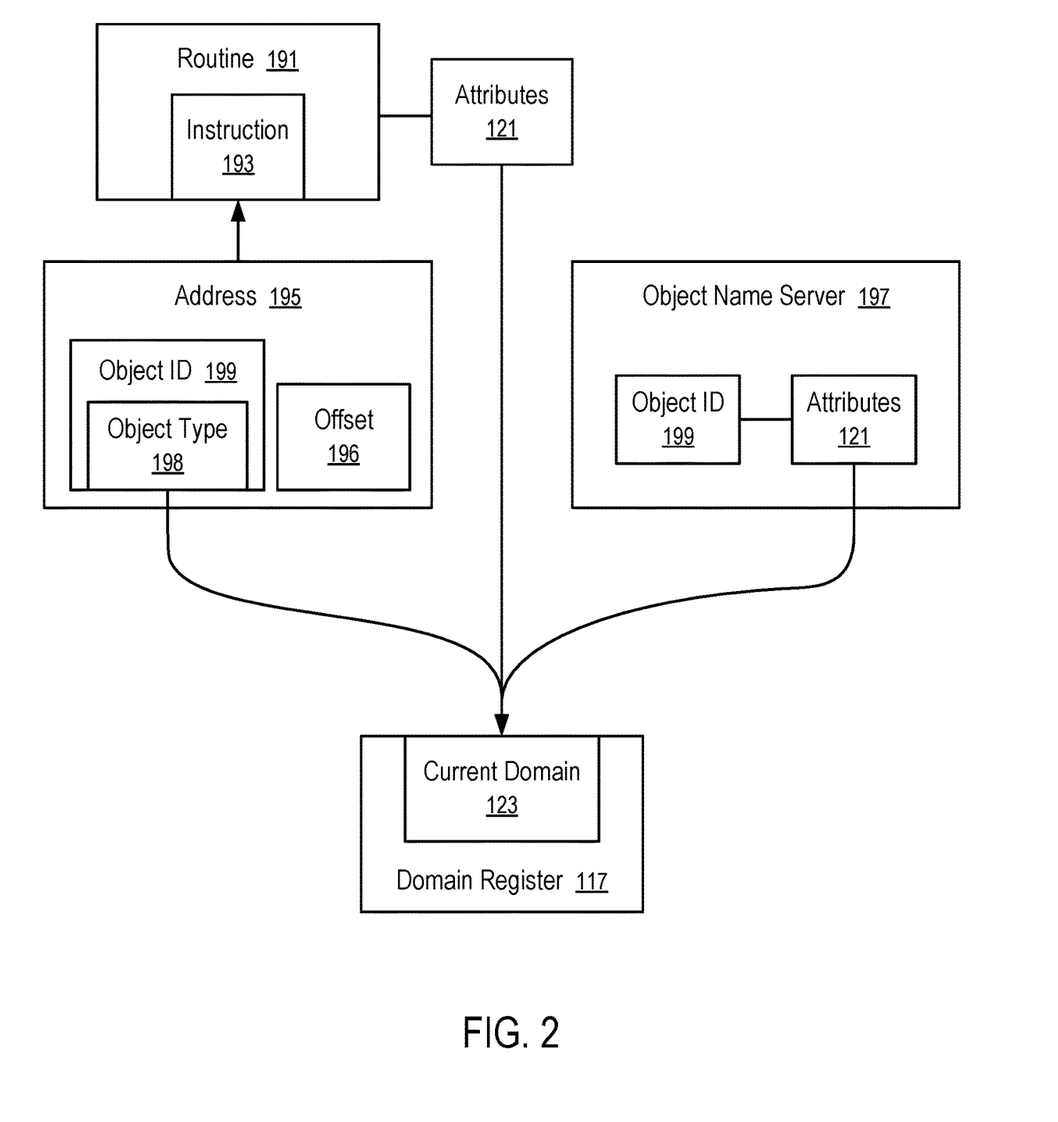
FIG. 2 illustrates some techniques to specify the current domain in the domain register in the computer processor of FIG. 1.

FIG. 2 illustrates some techniques to specify the current domain (123) in the domain register (117) in the computer processor (169) of FIG. 1.

In some instances, the current domain (123) can be identified from an address (195) used to load an instruction (193) of a routine (191) for execution.

For example, the address (195) has a predetermined width (e.g., a predetermined number of bits) for the processor (169). The address (195) can include a portion representing an object ID (199) and a portion representing an offset (196) within the object represented by the object ID (199). For example, the routine (191) can be an object located at the address (195); and the object ID (199) of the address (195) can be used to identify certain proprieties of the instruction (193) and/or the routine (191); and the current domain (123) can be determined from the properties.

For example, a static object ID (199) of a predetermined value (e.g., 0) can be used to represent a kernel object of an operating system (104). Thus, the static object ID (199) specified in the address (195) can be used to identify the current domain (123) for the execution of the routine (191). Some details and examples of static object IDs in memory addresses for computer processors to load instructions for execution can be found in U.S. patent application Ser. No. 16/028,840, filed Jul. 6, 2018 and entitled "Static Identifications in Object-based Memory Access," the entire disclosure of which application is hereby incorporated herein by reference.

In some instances, the object ID (199) can include a portion representing an object type (198). For example, an object type of a value from 0 to 3 can be used to identify a kernel object of an operating system. For example, an object type of a value of 4 to 5 can be used to specify that the offset (196) is an address of different widths (e.g., a 64-bit address or 32-bit address included within the address (195) that has 128 bits). For example, an object type of a value of 6 to 7 can be used to specify that a predetermined portion of the object ID (199) is to be interpreted as an identifier of a local object or an object in Partitioned Global Address Space (PGAS). For example, an object type of a value of 32 can be used to specify that the remaining portion of the object ID (199) is to be interpreted as an identifier of an object defined in a server (e.g., 197). For example, an object name server (197) can store data indicating the name of an object represented by an object ID, access control parameters of the object, and/or other attributes (121) of the object.

For example, the object ID (199) of the address (195) used to load the routine (191) for execution can have attributes (121) stored in the object name server (197). The attributes (121) can be used to determine or infer the current domain (123) of the routine (191) loaded from the address (195).

In some instances, the routine (191) has attributes (121) that are stored in association with the routine (191) (e.g., in the memory (109), in a page table entry for the determination of a physical address of the instruction (193), in an entry table for making calls for the execution of routines). When the routine (191) is loaded for execution, the attributes (121) of the routine (191) are used to determine the current domain (123) for the execution of the routine (191).

For example, a call to a routine (191) can be made via an entry table specified for a domain that contains the routine (191). The call instruction specifies a domain from which an entry point of the call is looked up from the entry table to load the routine (191). Thus, the current domain (123) can be set based on the entry table of the domain used to load the routine (191).

Figure 3:
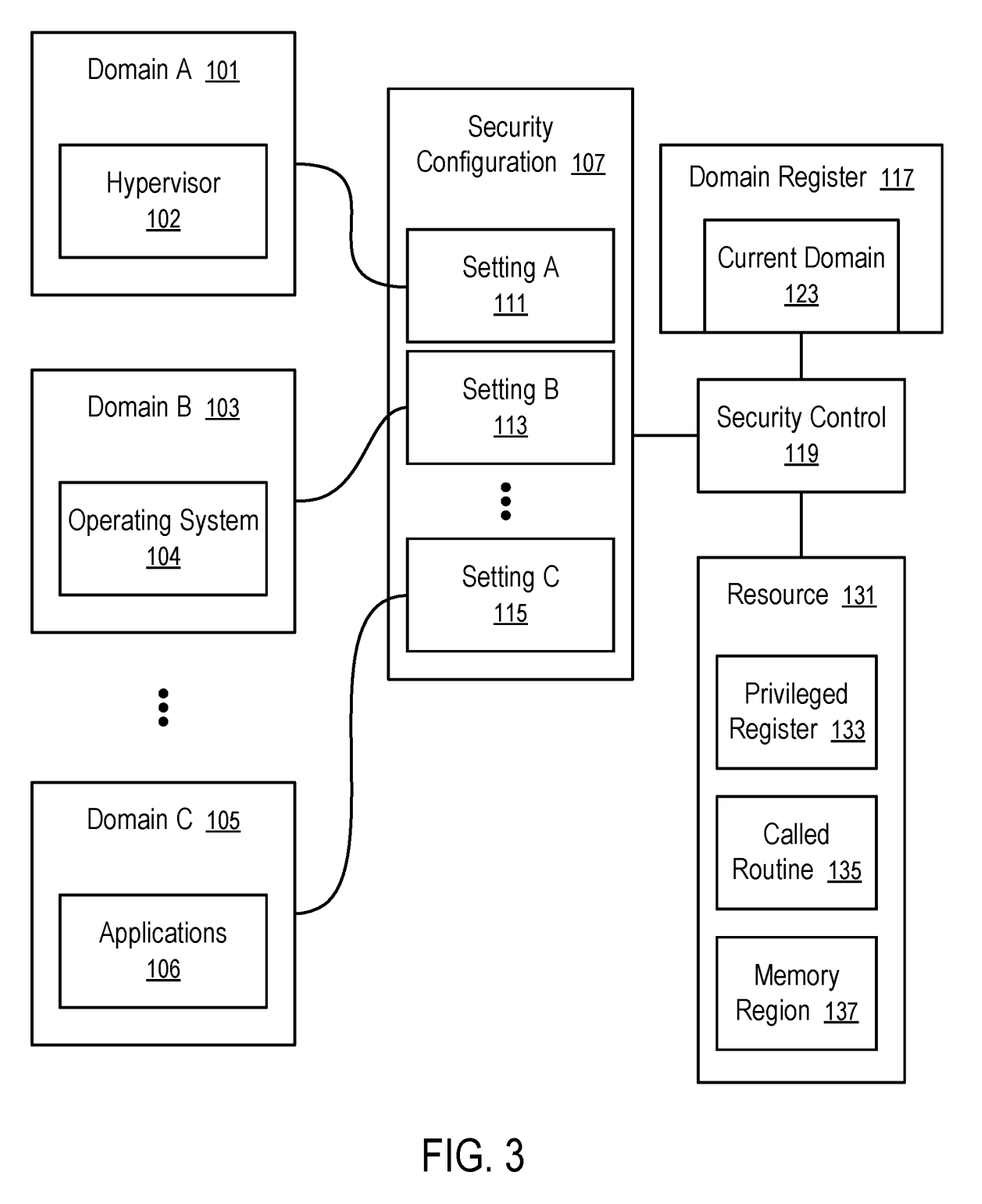
FIG. 3 shows a system to control security operations applied to resources in accordance with a domain register.

FIG. 3 shows a system to control security operations applied to resources (e.g., 131) in accordance with a domain register (117).

In FIG. 3, a security control (119) is implemented based on the current domain (123) specified in the domain register (117), and the security configuration (107) having settings (111, 113, . . . , 115) specified separately for the predefined domains (101, 103, . . . , 105) respectively. The security control (119) is applied to a resource (131), which can be a privileged register (133), a called routine (135), a memory region (137), etc.

The security configuration (107) can have settings (111, 113, . . . , 115) for the domains (101, 103, . . . , 105) respectively, without relying upon a static hierarchy of trust among the domains (101, 103, . . . , 105).

During the executing of a routine (191) in the processor (169), the domain register (117) causes the security control (119) to select a setting (e.g., 111, 113, . . . , or 115) that is pre-associated with a domain (e.g., 101, 103, . . . , or 105) matching with the current domain (123). The selected setting (e.g., 111, 113, . . . , or 115) is used by the security control (119) to customize security operations for the resource (131).

For example, when the execution of an instruction (193) of the routine (191) in the processor (169) requests memory access to the memory region (137), the selected setting (e.g., 111, 113, . . . , or 115) having its pre-associated domain (e.g., 101, 103, . . . , 105) matching the current domain (123) is used by the security control (119) to determine whether the memory access permissible.

For example, different regions (e.g., 137) in the memory (109) can be configured with different security configurations (e.g., 107); and each security configuration (e.g., 107) can include different permissions (e.g., 111, 113, . . . , 115)

for different domains (101, 103, . . . , 105). The security configuration (107) can be specified, for example, in a page table entry used in logical to physical address translation of virtual memory addresses, such that the structure of the memory regions can correspond to the memory page structure, as further discussed below in connection with FIG. 4.

For example, the physical memory (109) can be divided into multiple regions; each region (e.g., 137) can be a page of physical memory (109) for memory management, or a set of pages of physical memory (109).

For example, a typical memory region (137) can have a respective security configuration (107) specified for the set of predefined domains (101, 103, . . . , 105). The security configuration (107) explicitly identify the permissions (e.g., 111, 113, . . . , 115) for the domains (101, 103, . . . , 105) respectively. Thus, the privileges of routines to access the memory region (137) are not dependent on a hierarchy of the domains (101, 103, . . . , 105).

In one example, when a routine (191) executed in the current domain (123) causes memory access to the memory region (137) for read, write, or execution of instructions, the domain register (117) causes the security control (119) to check the permission specified in the setting (111, 113, . . . , or 115) that is corresponding to the current domain (123). Whether or not to block (or reject) an access to the memory region (137) for a particular type of operations (e.g., read, write, execution) by the execution of an instruction (193) of the routine (191) in the current domain (123) can be determined based on a respective permission bit that is selected according to the current domain (123) for the memory region (137), and for the type of operations. Some details and examples of permissions for memory access to the memory region (137) can be found in U.S. Pat. App. Ser. No. 62/724,896, filed on Aug. 30, 2018 and entitled "Memory Access Control through Permissions Specified in Page Table Entries for Execution Domains," the entire disclosure of which application is hereby incorporated herein by reference.

In general, different routines of a same domain (e.g., 103) can be configured to in different memory regions and thus configured to have different permissions and security settings for the same domain (e.g., 103).

Further, a routine can be configured to store different portions of its data in different memory regions (e.g., 137) and thus configured to have different permissions for accessing from a same domain (e.g., 101, 103, . . . , or 105).

In another example, when a routine (191) executed in the current domain (123) calls a called routine (135) stored in the memory region (137) for execution, the domain register (117) causes the security control (119) to check the permission specified in the setting (111, 113, . . . , or 115) that is corresponding to the current domain (123). Whether or not to deploy a security measure to protect the resources of the calling routine (191) against the called routine (135) and/or protect the resources of the called routine (135) against the calling routine can be determined based on a respective permission bit that is specified for the current domain (123) and for the memory region (137).

Security measures can include sandboxing. Sandboxing in general includes a computer security measure that isolates the execution of a set of instructions (e.g., an application) from certain system resources and/or other sets of instructions/programs. For example, sandboxing can be implemented using a shadow stack structure where the calling routine and the called routine are configured to use separate stacks and control registers related to the stacks, the calling routine can be prevented from accessing the stack assigned to the called routine, and the called routine can be prevented from accessing the stack assigned to the calling routine. Some details and examples of a shadow stack structure can be found in U.S. Pat. App. Ser. No. 62/724,913, filed on Aug. 30, 2018 and entitled "Security Configurations in Page Table Entries for Execution Domains," the entire disclosure of which application is hereby incorporated herein by reference.

For example, the security configuration (107) of a typical memory region (137) can have sandboxing settings (e.g., 111, 113, . . . , 115) specified for the set of predefined domains (e.g., 101, 103, . . . , 105) respectively. The sandboxing configuration (107) explicitly identifies whether or not a sandboxing operating is required for a call to execution a called routine (135) stored in the region (137). Calls to execute the same routine (135) from routines executed in the different domains (101, 103, . . . , 105) can have different settings (111, 113, . . . , 115); and the settings (111, 113, . . . , 115) specify whether the calls from the respectively domains (101, 103, . . . , 105) require sandboxing (e.g., to protect the called routine (135) and the calling routine (191) from each other). Thus, the sandboxing operations can be selectively applied for the execution of the called routine (135) stored in the memory region (137), based on the current domain (123) identified in the domain register (117) and the explicit settings (e.g., 111, 113, . . . , 115) configured for the respective domains (101, 103, . . . , 105), without relying upon a predefined hierarchy of domains (101, 103, . . . , 105).

For example, a calling routine (191) in the current domain (123) can call the called routine (135). Whether or not to invoke a sandboxing operation for the call to execute the called routine (135) stored in the memory region (137) can be determined based on the sandbox setting (e.g., 111, 113, . . . , or 115) that is specified for the respective domain (e.g., 101, 103, . . . , or 105) matching with the current domain (123) for the memory region (137). Thus, the sandboxing operation can be invoked independent of a relative hierarchy between the domain of the called routine (135) and the current calling domain (123).

The sandbox settings (107) for routines stored in the memory region (137) can be specified, for example, in a page table entry used in logical to physical address translation of virtual memory addresses, such that the structure of the memory regions can correspond to the memory page structure, as further discussed below in connection with FIG. 4.

In a further example, when a routine (191) executed in the current domain (123) requests access to a privileged register (133), the domain register (117) causes the security control (119) to check the permission specified in the setting (111, 113, . . . , or 115) for the privileged register (133). Whether or not to permit or block the access can be determined based on a respective permission bit that is specified for the current domain (123) and for the privilege register (133).

For example, the privileged register (133) can have different permissions (111, 113, . . . , 115) for the different domains (101, 103, . . . , 105) respectively. When an instruction executed in the current domain (123) requests to access the register privileged (133), the domain register (117) causes the security control (119) to select a respective permission (e.g., 111, 113, . . . , or 115) corresponding to the current domain (123) to control the access.

The register (133) can have explicit permissions (111, 113, . . . , 115) specified separately for the domains (101,

103, ..., 105) respectively (e.g., non-hierarchical), without relying upon a predefined hierarchy of trust for the domains (101, 103, ..., 105).

In some instances, the privileged register (133) can be accessed for different types of operations, such as read, write, execution, etc. The permission (e.g., 111, 113, ..., or 115) for a particular domain (e.g., 101, 103, ..., or 105) to access the privileged register (133) can have separate permission bits for the respective types of operations (e.g., read, write, and/or execution).

The security configuration (107) can be configured to allow an instruction running in one domain (e.g., 101, 103, ..., 105) to access the register (133) for one type of operations (e.g., read) but not for another type of operations (e.g., write).

The security configuration (107) can be configured to allow an instruction executing in one domain (e.g., 103) to access the register (e.g., 133) via one permission setting (e.g., 113) for the domain (e.g., 103), but prohibit the same instruction running in another domain (e.g., 101) from accessing the register (133) via another concurrent setting (e.g., 111) for that domain (e.g., 101), even when the disallowed domain (e.g., 101) can be more privileged (and thus trusted) than the allowed domain (e.g., 103) in traditional protection rings.

In one implementation, the security configuration (107) is hardwired in a processor for the privileged register (133). In another implementation, the security configuration (107) can be set via firmware for the register (133) of a processor during a start-up/boot up process of a computer system. In a further implementation, the security configuration (107) can be changed via privileged software during the normal operations of the computer system.

For example, the security configuration (107) for the privileged register (133) can be changed when the processor (169) switches from running a program in one domain (e.g., 101) to running a program in another domain (e.g., 103).

For example, the security configuration (107) for the privileged register (133) can be changed in accordance with a request when the computer system switches from running one routine to another routine, where the routines can be in the same domain (e.g., 101).

For example, the security configuration (107) for the privileged register (133) can be configured in a permission register that controls access to the privileged register (133) using permission bits stored in the permission register; and the content of the permission register can be updated by an authorized process to adjust/customize the security level of the computer system for the current computation. Alternatively, permissions bits for different domains (101, 103, ..., 105) can be specified in separate registers that correspond to the domains (101, 103, ..., 105) respectively. Some details and examples of permission registers can be found in U.S. Pat. App. Ser. No. 62/724,929, filed on Aug. 30, 2018 and entitled "Access Control for Processor Registers based on Execution Domains," the entire disclosure of which application is hereby incorporated herein by reference.

Since the security control system of FIG. 3 does not rely upon a predefined domain hierarchy of trust (i.e., non-hierarchical), it can provide better flexibility and finer control granularity than the conventional protection rings.

Figure 4:
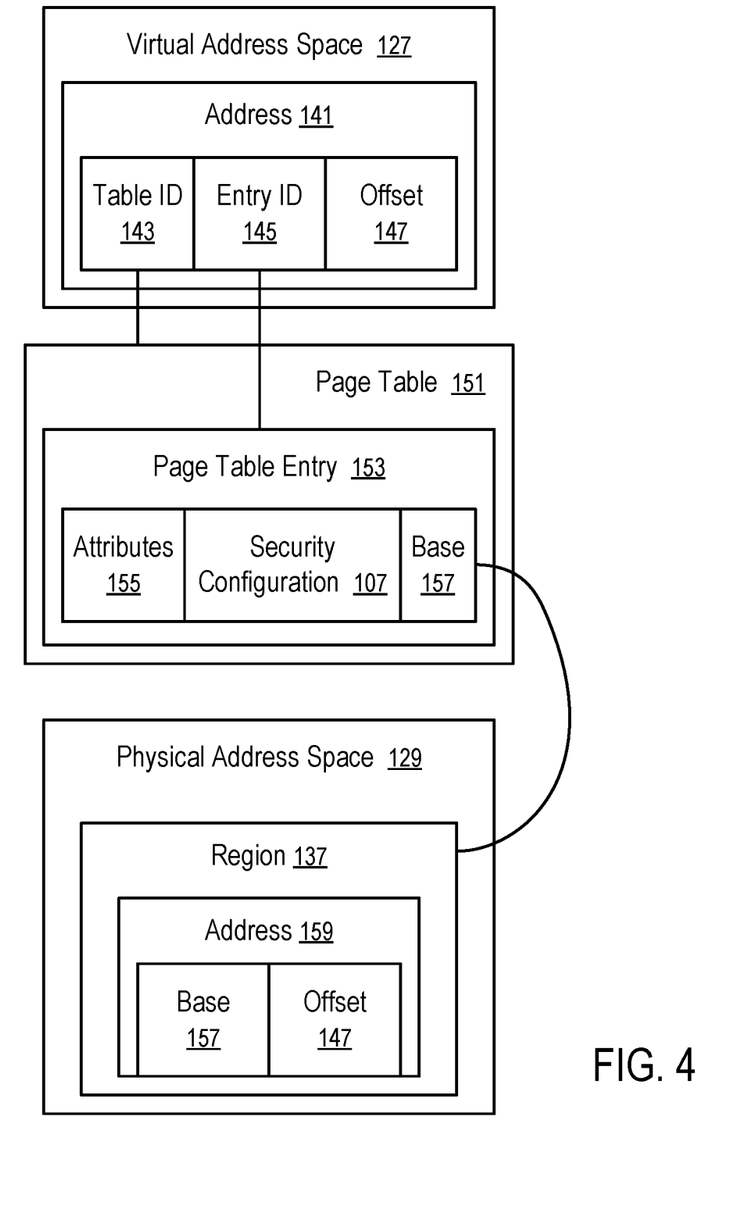
FIG. 4 illustrates a page table entry having a security configuration for execution domains.

FIG. 4 illustrates a page table entry (153) having a security configuration (107) for execution domains (e.g., 101, 103, ..., 105).

For example, the security configuration (107) in the page table entry can be permissions for accessing the memory region (137) identified by the page table entry (153) and/or sandboxing configuration for calling routines stored in the memory region (137) that is identified by the page table entry (153).

A typical virtual address (141) in a virtual address space (127) can be translated into a corresponding physical address (159) in a physical address space (129) using a page table (151). In general, multiple page tables (e.g., 151) can be used to map the virtual address space (127) to the physical address space (129).

The virtual address (141) can include a table ID (143), an entry ID (145), and an offset (147). The table ID (143) can be used to identify a page table (151) that contains a page table entry (153) for a page that contains the memory unit that is identified by the virtual address (141) and the physical address (159). The entry ID (145) is used as an index into the page table (151) to locate the page table entry (153) efficiently. The page table entry (153) provides a base (157) of the physical address (159). Physical addresses in the same page of memory share the same base (157). Thus, the base (157) identifies the region (137) in the memory (109). The offset (147) of the virtual address (141) is used as a corresponding offset (147) in the page or region (137) in the memory (109). The combination of the base (157) and the offset (147) provides the physical address (159) corresponding to the virtual address (141).

In FIG. 4, the page table entry (153) specifies not only the base (157) for the page or region (137), but also the security configuration (107) for the page or memory region (137), such as permissions for reading data into the memory region (137) corresponding to the base (157), permissions for writing data into the memory region (137), permissions for executing instructions stored in the memory region (137), sandboxing requirements for calling routines stored in the memory region (137). The security configuration (107) can have separate settings (111, 113, ..., 115) respectively for the predefined, non-hierarchical domains (101, 103, ..., 105) illustrated in FIGS. 1 and 3. The current domain (123) in the domain register (117) controls which one of the settings (111, 113, ..., 115) is used for a current memory access, or a current call to a routine (135) stored in the memory region (137).

Optionally, the page table entry (153) can specify other attributes (155) of the page of physical memory, such as whether the data in the page is valid, whether the page is in main memory, whether the page is dirty (e.g., the changes in data in the page of physical memory have not yet been flushed to a longer-term memory/storage device relative to the memory region (137)). For example, the attributes (155) can include a page fault bit indicating whether the page is in the main memory of the computer or in a storage device of the computer. If the permissions in the security configuration (107) allow the current access to the page of memory and the page fault bit indicate that the page is currently not in the main memory of the computer, the memory management unit (181) can swap the page from the storage device into the main memory of the computer to facilitate the access to the page identified by the page table entry (153). However, if the permissions in the security configuration (107) deny the current access to the page for the current execution domain, it is not necessary to evaluate the page fault bit and/or to swap in the page corresponding to the page table entry (153).

In general, the table ID (143) can be divided into multiple fields used to locate the page table (151). For example, the table ID (143) can include a top table ID identifying a top-level page table and a top table entry ID that is used as an index into the top-level page table to retrieve a page table entry containing an identifier of the page table (151), in a way similar to the entry ID (145) indexing into the page table (151) to identify the page table entry (153) containing the base (157).

In general, an entry ID (145) can be considered a virtual page number in the page table (151); and the virtual page number (e.g., entry ID 145) can be used in the page table (151) to look up the page table entry (153) containing the base (157).

For example, the table ID (143) can include a set of virtual page numbers that can be used to identify a chain of page tables (e.g., 151). Each virtual page number is used as an index in a page table (or page directory) to identify the page table entry (or page directory entry) that contains the identity or base of the next level page table (or page directory).

In some instances, different running processes in a computer can have different virtual address spaces (e.g., 127); and the process ID of a running process can be used in determine the top-level page table (or page directory). In some instances, a hash of a portion of the virtual address (141), the process ID, and/or an identification of a virtual machine hosted in the computer system can be used to locate the top-level page table (or page directory). In some instances, a hash is used as an index or key to look up a page table entry. Regardless of how the page table entry (153) is located (e.g., via indexing through multiple page tables, via the use of a hash as an index or key), the content of the page table entry (153) can be configured in a way as illustrated in FIG. 4 to provide the security configuration (107) for different domains (101, 103, . . . , 105) to access the page/memory region (137) and/or the routines stored in the memory region (137) that corresponds to the base (157).

In FIG. 4, the security configuration (107) for a page or region (137) is specified in the bottom-level page table (151), where the page table entry (153) in the bottom-level page table (151) provides the base (157) of the physical address (159).

Alternatively, or in combination, higher-level page tables (or page directories) can also have security configurations for their page table entries (or page directory entries). For example, a page table entry (or page directory entry) identifying the page table (151) can have security configurations for all of the pages in the page table (151); and thus, the domain permission data in the page table entry is applicable to the memory region defined by the page table (151). The hierarchy of security configurations in the chain of page table entries leading to the page table (151) and the security configuration (107) in the bottom-level page table entry (153) can be combined via a logic AND operation or a logic OR operation.

For example, a routine running in a domain (e.g., 101, 103, . . . , 105) can be allowed to access a page identified by the base (157) if all of the permission bits in the chain of page table entries leading to the base (157), including the bottom-level page table entry (153), have the value that allows access. Alternatively, a routine running in a domain (e.g., 101, 103, . . . , 105) can be allowed to access a page identified by the base (157) if any of the permission bits in the chain of page table entries leading to the base (157), including the bottom-level page table entry (153), have the value that allows access.

For example, a routine running in a domain (e.g., 101, 103, . . . , 105) can be denied of access to a page identified by the base (157) if any of the permission bits in the chain of page table entries leading to the base (157), including the bottom-level page table entry (153), have the value that denies access. Alternatively, a routine running in a domain (e.g., 101, 103, . . . , 105) can be denied of access to a page identified by the base (157) only when all of the permission bits in the chain of page table entries leading to the base (157), including the bottom-level page table entry (153), have the value that denies access.

For example, when a non-bottom-level page table entry (or page directory entry) indicates that the memory access is prohibited, the operations to translate from the virtual address (141) to the physical address (159) can be interrupted to reject the memory access associated with the virtual address (141). In response to the rejection, a trap to the software designated to handle the rejection is used.

For example, the security configuration (107) can include a set of sandbox setting bits (e.g., 111, 113, . . . , 115) for the set of domains (101, 103, . . . , 105) respectively. When a sandbox setting bit (e.g., 111, 113, . . . , or 115) corresponding to the current domain (123) in the domain register (117) is set to have a first value (e.g., 1 or 0), a current call from a routine (191) in the current domain (123) to a called routine (135) stored in the region (137) is implemented to use a sandboxing operation to protect the calling routine (191) and the called routine (135) from each other (e.g., by using a shadow stack to separate the caller and callee in stack usage). When a sandbox setting bit (e.g., 111, 113, . . . , or 115) corresponding to the current domain (123) in the domain register (117) is set to have a second value (e.g., 0 or 1), a call from the routine (191) in the current domain (123) to the called routine (135) stored in the memory region (137) is implemented without using the sandboxing operation to isolate the caller and callee from each other (e.g., without using a shadow stack).

Optionally, the security configuration (e.g., 107) is specified in the bottom-level page table (151) but not in the higher-level page tables (directories).

Figure 5:
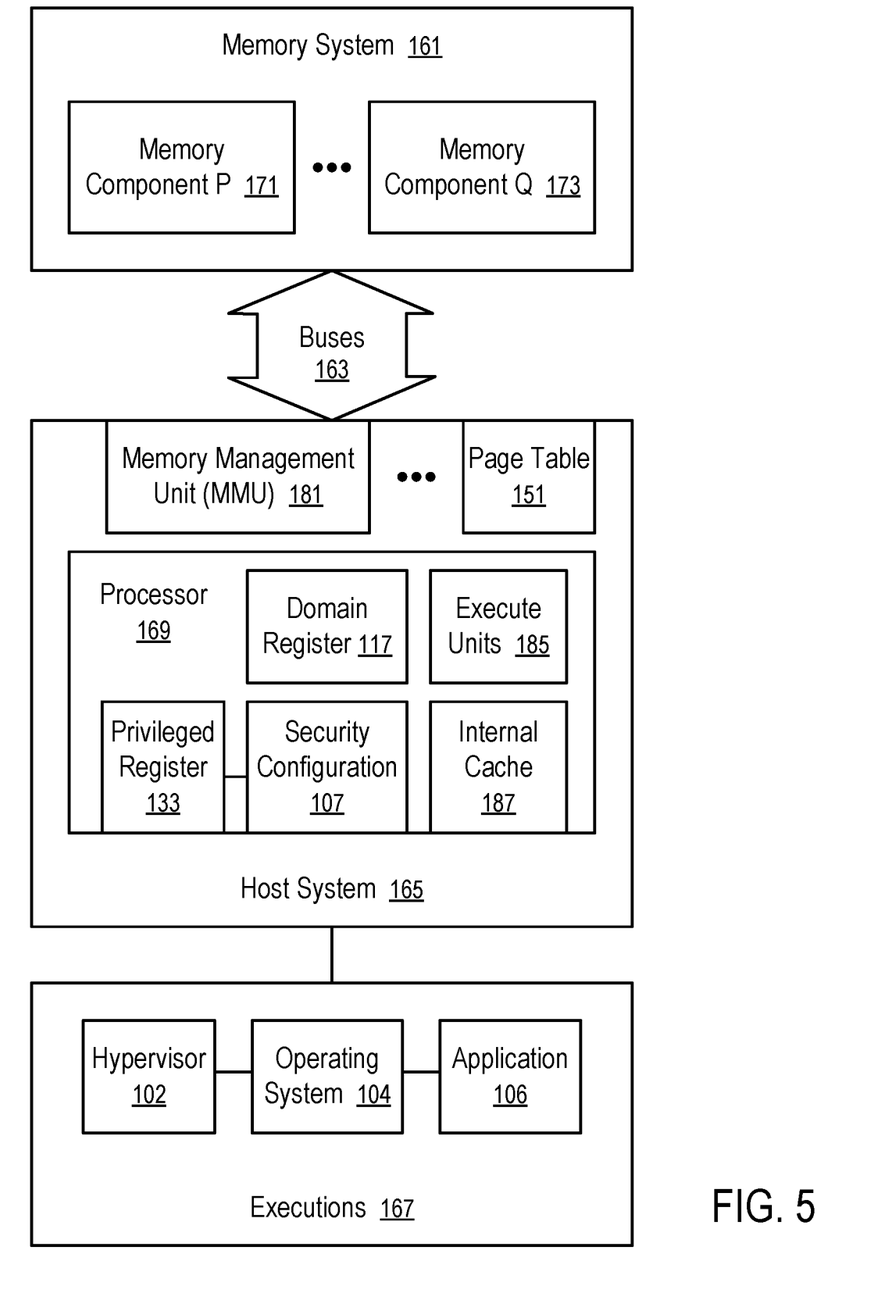
FIG. 5 shows a computer system having a domain register controlling security operations.

FIG. 5 shows a computer system having a domain register (117) controlling security operations.

For example, the computer system of FIG. 5 can optionally have a page table (e.g., 151) storing security configuration (107) for accessing memory region identified by a page table entry (153) of FIG. 4 by routines in predefined domains (101, 103, . . . , 105) illustrated in FIGS. 1 and 3.

For example, the computer system of FIG. 5 can have one or more permission registers storing the security configuration (107) for accessing the privileged register (133) for predefined domains (101, 103, . . . , 105) illustrated in FIGS. 1 and 3.

The domain register (117) of the processor (169) stores the identifier of the current domain (123). The content of the domain register (117) selects a set of applicable settings of the security configuration (107) corresponding to the current domain (123).

The computer system of FIG. 5 has a host system (165) coupled to a memory system (161) via one or more buses (163). The memory system (161) has memory components (171, . . . , 173).

For example, the buses (163) can include a memory bus connecting to one or more memory modules and/or include a peripheral internet connecting to one or more storage devices. Some of the memory components (171, . . . , 173) can provide random access; and the some of the memory components (171, . . . , 173) can provide persistent storage capability. Some of the memory components (171, . . . , 173) can be volatile in that when the power supply to the memory component is disconnected temporarily, the data stored in the memory component will be corrupted and/or erased. Some of the memory components (171, . . . , 173) can be non-volatile in that the memory component is capable of retaining content stored therein for an extended period of time without power.

In general, a memory system (161) can also be referred to as a memory device. An example of a memory device is a memory module that is connected to a central processing unit (CPU) via a memory bus. Examples of memory modules include a dual in-line memory module (DIMM), a small outline DIMM (SO-DIMM), a non-volatile dual in-line memory module (NVDIMM), etc. Another example of a memory device is a storage device that is connected to the central processing unit (CPU) via a peripheral interconnect (e.g., an input/output bus, a storage area network). Examples of storage devices include a solid-state drive (SSD), a flash drive, a universal serial bus (USB) flash drive, and a hard disk drive (HDD). In some instances, the memory device is a hybrid memory/storage system that provides both memory functions and storage functions.

The memory components (171, . . . , 173) can include any combination of the different types of non-volatile memory components and/or volatile memory components. An example of non-volatile memory components includes a negative-and (NAND) type flash memory with one or more arrays of memory cells such as single level cells (SLCs) or multi-level cells (MLCs) (e.g., triple level cells (TLCs) or quad-level cells (QLCs)). In some instances, a particular memory component can include both an SLC portion and an MLC portion of memory cells. Each of the memory cells can store one or more bits of data (e.g., data blocks) used by the host system (165). Alternatively, or in combination, a memory component (171, . . . , or 173) can include a type of volatile memory. In some instances, a memory component (171, . . . , or 173) can include, but is not limited to, random access memory (RAM), read-only memory (ROM), dynamic random access memory (DRAM), synchronous dynamic random access memory (SDRAM), phase change memory (PCM), magneto random access memory (MRAM), Spin Transfer Torque (STT)-MRAM, ferroelectric random-access memory (FeTRAM), ferroelectric RAM (FeRAM), conductive bridging RAM (CBRAM), resistive random access memory (RRAM), oxide based RRAM (OxRAM), negative-or (NOR) flash memory, electrically erasable programmable read-only memory (EEPROM), nanowire-based non-volatile memory, memory that incorporates memristor technology, and/or a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased.

In general, a host system (165) can utilize a memory system (161) as physical memory (109) that includes one or more memory components (171, . . . , 173). The host system (165) can load instructions from the memory system (161) for execution, provide data to be stored at the memory system (161), and request data to be retrieved from the memory system (161).

In FIG. 5, the host system (165) includes a memory management unit (MMU) (181) and a processor (169). The processor (169) has execution units (e.g., 185), such as an arithmetic-logic unit. The processor (169) has registers (183, e.g., 133) to hold instructions for execution, data as operands of instructions, and/or results of instruction executions. The processor (169) can have an internal cache (187) as a proxy of a portion of the memory system (161).

In some instances, the host system (165) can include multiple processors (e.g., 169) integrated on a same silicon die as multiple processing cores of a central processing unit (CPU).

Routines programmed for executing in the processor (169) can be initially stored in the memory system (161). The routines can include instructions for a hypervisor (102), an operating system (104), and an application (106). The routines stored initially in the memory system (161) can be loaded to the internal cache (187) and/or the registers (183, e.g., 133) for execution in the execution units (185).

The running instances of the routines form the executions (167) of the hypervisor (102), the operating system (104), and the application (106). In some instances, a hypervisor (102) is not used; and the operating system (104) controls the hardware components (e.g., the memory system (161), peripheral input/output devices, and/or network interface cards) without a hypervisor.

The executions (167) of the hypervisor (102), the operating system (104), and/or the application (106) access memory (137) (e.g., in memory components (171, . . . , 173)) using virtual memory addresses (e.g., 141) defined in one or more virtual memory spaces (e.g., 127). At least one page table (151) (e.g., as illustrated in the FIG. 4) can be used to translate the virtual memory addresses (e.g., 141) used in the execution to the physical memory addresses (e.g., 159) of the memory components (e.g., 171, . . . , 173).

As illustrated in FIG. 1, the executions of the routines of hypervisor (102), the operating system (104), and the application (106) can be organized into a plurality of domains (101, 103, . . . , 105). For each of the execution domains (101, 103, . . . , 105) and a memory region (137) identified by a page table entry (153), the page table entry (153) identifies a set (e.g., 111, 113, . . . , 115) of security configuration bits for accessing the region (137) in predefined types of operations such as read, write, execution, etc. The configuration bits of the corresponding security configuration (e.g., 107) controls the memory accesses of the corresponding types from a respective execution domain (e.g., 101) and/or controls the sandboxing operations for isolating calling routines (e.g., 191) and called routines (e.g., 135).

The security configuration (107) of the privileged register (133) can be stored in separate permission registers. Each of the permission registers is pre-associated with a domain (e.g., 101, 103, . . . , 105). A permission register stores a permission bit for accessing the privileged register (133) from the corresponding domain (e.g., 101, 103, . . . , or 105). Different permission bits in the permission register can be configured for different privileged registers (e.g., 133). In some instances, a privileged register (133) can have multiple permission bits in a permission register for different types of accesses (e.g., read, write, execution).

Alternatively, permission bits for the privileged register (133) can be specified in a same permission register. Further, permission bits for different privileged register (e.g., 133) can be stored in different portions of the same permission register.

Figure 6:
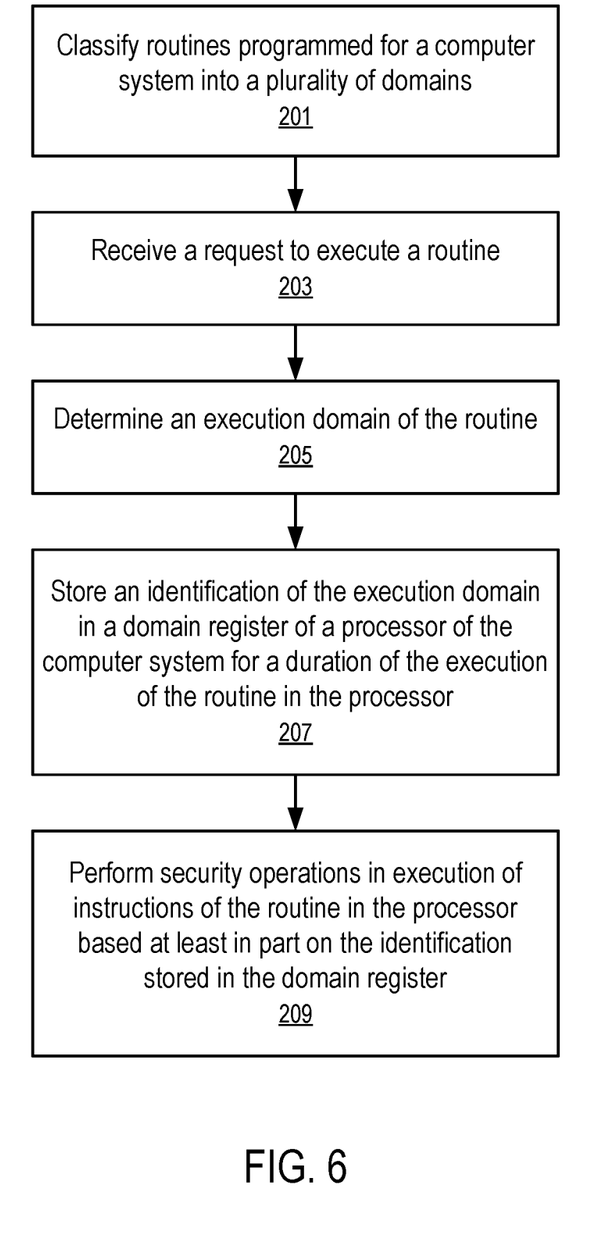
FIG. 6 shows a method to control security operations using a domain register.

FIG. 6 shows a method to control security operations using a domain register (117).

For example, the method of FIG. 6 can be performed in a computer system of FIG. 5, using a page table (151) of FIG. 4 specifying security configuration (107) of FIG. 3 for execution domains (101, 103, . . . , 105) illustrated in FIGS. 1 and 3.

At block 201, a computer system (e.g., illustrated in FIG. 5) classifies routines (e.g., 191, 135) programmed for the system into a plurality of domains (101, 103, . . . , 105).

For example, the domains (101, 103, . . . , 105) of the routines (e.g., 191) can be identified via the addresses (195) used to load the routines (e.g., 191), or via attributes (e.g., 121) stored in association with the routines (e.g., 191).

At block 203, a processor (169) of the computer system receives a request to execute a routine (e.g., 191).

At block 205, the processor (169) determines an execution domain (123) of the routine (e.g., 191).

For example, the techniques discussed above in connection with FIG. 2 can be used to determine the current domain (123) of the routine (191) that is loaded into the processor (169) for execution.

At block 207, the processor (169) store an identification of the execution domain (123) in a domain register (117) of the processor of the computer system for a duration of the execution of the routine (191) in the processor (169).

At block 209, the processor (169) performs security operations in execution of instructions of the routine (e.g., 191) in the processor (169) based at least in part on the identification of the current domain (123) stored in the domain register (117).

Examples of the security operations include controlling access to memory regions (e.g., 137) for read, write, and/or execution, selectively deploying sandboxing operations to isolate contents and/or resources of calling routines (191) and called routines (e.g., 135), controlling access to a privileged register (133), in response to executing an instruction (193) of the routine (191). The identification of the current domain (123) stored in the domain register (117) can be used to select a subset of the security configuration (107) that corresponds to the current domain (123); and the selected subset is used for the security control (119) of the resource (131), such as the privileged register (133), the memory region (137), the called routine (135) stored in the memory region (137), etc.

The techniques disclosed herein can be applied to at least to computer systems where processors are separated from memory and processors communicate with memory and storage devices via communication buses and/or computer networks. Further, the techniques disclosed herein can be applied to computer systems in which processing capabilities are integrated within memory/storage. For example, the processing circuits, including executing units and/or registers of a typical processor, can be implemented within the integrated circuits and/or the integrated circuit packages of memory media to performing processing within a memory device. Thus, a processor (e.g., 169) as discussed above and illustrated in the drawings is not necessarily a central processing unit in the von Neumann architecture. The processor can be a unit integrated within memory to overcome the von Neumann bottleneck that limits computing performance as a result of a limit in throughput caused by latency in data moves between a central processing unit and memory configured separately according to the von Neumann architecture.

The description and drawings of the present disclosure are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

In the foregoing specification, the disclosure has been described with reference to specific exemplary embodiments thereof. It will be evident that various modifications can be made thereto without departing from the broader spirit and scope as set forth in the following claims. The specification and drawings are, accordingly, to be regarded in an illustrative sense rather than a restrictive sense.

What is claimed is:

1. A device, comprising:
a plurality of execute units configured to perform operations identified by instructions loaded from a memory; and
a domain register configured to store an identifier of a current domain of a routine having instructions being executed via the plurality of execute units, wherein the current domain is in a predefined set of domains of routines;
wherein the device is configured to apply, based at least on a setting identified using the identifier of the current domain stored in the domain register, a security control on a resource to be accessed in execution of an instruction of the routine being executed via the plurality of execute units while the domain register has the identifier.

2. The device of claim 1, further comprising:
the memory configured to store the routines, wherein each of the routines stored in the memory is classified in one of the domains in the predefined set.

3. The device of claim 2, wherein the security control is configured to allow or deny, based on the setting, access to the memory during the execution of the instruction of the routine in the plurality of execute unit at a time when the domain register stores the identifier of the current domain.

4. The device of claim 3, wherein the access includes reading data from the memory, writing data into the memory, or loading an instruction from the memory for execution in the plurality of execute units, or any combination thereof.

5. The device of claim 2, further comprising:
a privileged register;
wherein the security control is configured to allow or deny, based on the setting, access to the privileged register during the execution of the instruction of the routine in the plurality of execute unit at a time when the domain register stores the identifier of the current domain.

6. The device of claim 2, wherein the routine being executed via the plurality of execute units is a calling routine; and when the execution of the instruction of the calling routine calls a called routine stored in the memory, the security control is configured to selectively deploy, based on the setting identified using the identifier of the current domain stored in the domain register, an operation to isolate the resource of the calling routine from the called routine.

7. The device of claim 6, wherein the setting is specified for the current domain and for a region in the memory.

8. The device of claim 7, wherein the region in the memory includes physical memory addresses identifiable via a page table entry.

9. The device of claim 8, wherein in response to the execution of the instruction of the calling routine to call the called routine stored in the region in the memory, the device is configured to:
determine, using the page table entry, a physical memory address to load the called routine for execution;
extract, based on the identifier of the current domain stored in the domain register, the setting from the page table entry; and determine, based on the setting, whether to allow or deny access to the physical memory address to load the called routine.

10. The device of claim 9, wherein the page table entry has a plurality of settings respectively for a plurality of domains in the predefined set.

11. The device of claim 10, wherein the page table entry includes a base for a page of physical addresses; and the region in the memory is the page represented by the base.

12. The device of claim 11, wherein the device is configured to combine the base and an offset specified in a virtual memory address to generate a physical address for the virtual memory address.

13. The device of claim 12, wherein the predefined set of domains comprises a domain for hypervisor, a domain for operating system, or a domain for application, or any combination thereof.

14. A method, comprising:
performing, using a plurality of execute units of a processor, operations identified by instructions loaded from a memory;
storing, in a domain register, a domain identifier of a routine having instructions being executed via the plurality of execute units, the domain identifier identifying a current domain among a predefined set of domains of routines;
determining, based on the domain identifier stored in the domain register, a setting; and
applying, based at least on the setting, a security control on a resource to be accessed in execution of an instruction of the routine being executed via the plurality of execute units at a time when the domain register has the domain identifier.

15. The method of claim 14, further comprising:
storing a plurality of settings in a page table entry for a plurality of domains respectively in the predefined set; and
extracting the setting from the page table entry using the domain register during translating a virtual memory address to a physical memory address according to the page table entry.

16. The method of claim 15, wherein the applying of the security control comprises:
determining, based on the setting, whether to allow or deny a request to access a memory unit identified by the virtual memory address.

17. The method of claim 15, wherein the routine is a first routine; the instruction calls a second routine stored at the virtual memory address; and wherein the applying of the security control comprises:
whether to isolate the first routine from the second routine.

18. A computer processor, comprising:
at least one execution unit configured to execute instructions; and
a domain register configured to store a domain identifier configured to identify a current domain among a predefined set of domains of routines;
wherein during execution of an instruction of the routine via the at least one execution unit, the computer processor is configured to:
determine, based on the domain identifier, a security setting; and
apply, based at least on the security setting, a security operation on a resource to be used in the execution of the instruction.

19. The computing device of claim 18, further comprising:
a privileged register;
wherein the security operation is applied to control access to the privileged register during the execution of the instruction of the routine.

20. The computing device of claim 19, further comprising:
a plurality of permission registers for a plurality of domains in the predefined set respectively, each of the permission registers storing a permission bit configured to indicate whether to allow or reject access to the privileged register during execution of an instruction at a time when the domain register stores an identifier of a respective domain in the plurality of domains.

* * * * *